Nov. 27, 1928. 1,692,918
R. BACHMAN
DRIVING MECHANISM FOR SLICING MACHINES
Filed April 14, 1923
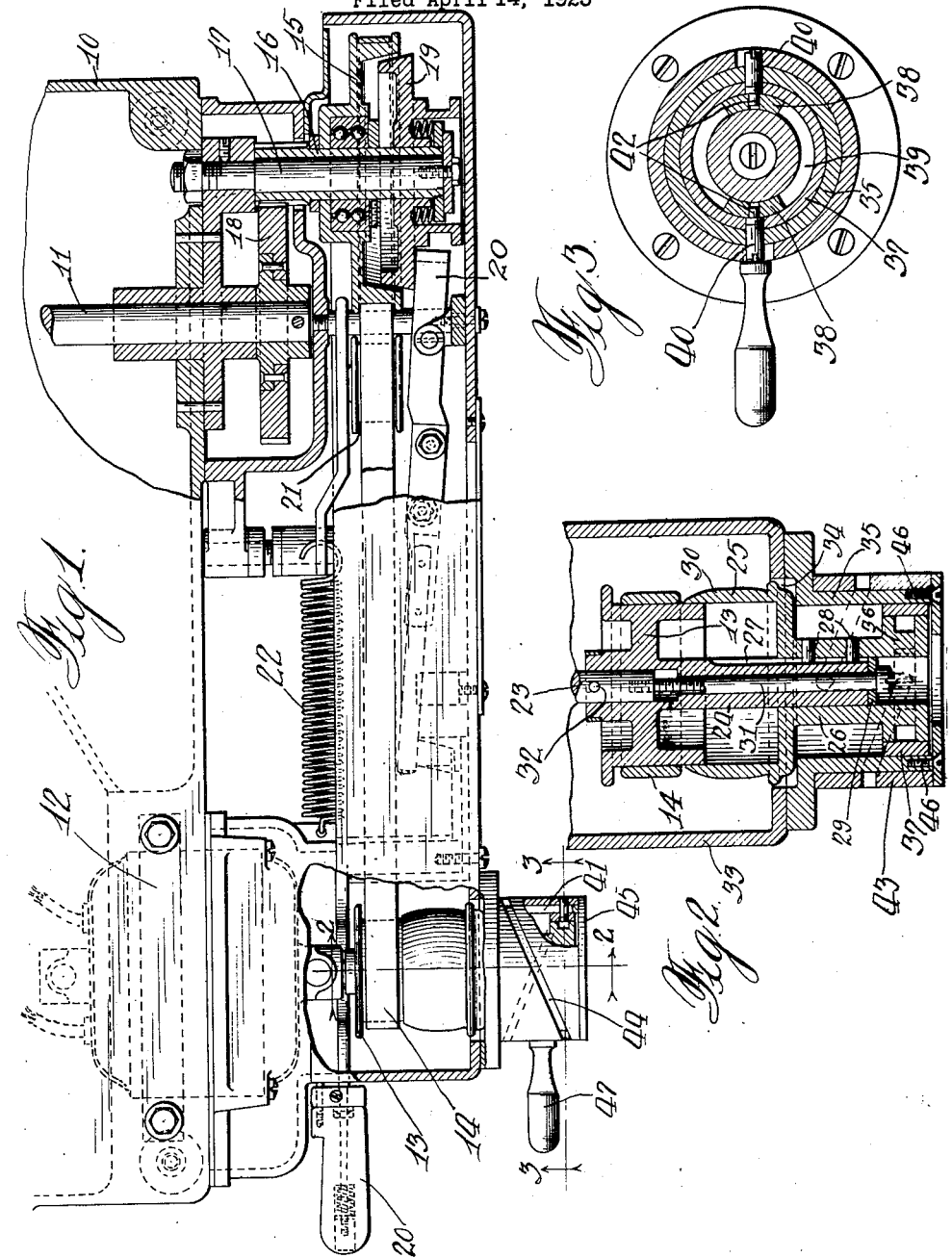
Inventor
Rudolph Bachman Patented Nov. 27, 1928.

1,692,918

UNITED STATES PATENT OFFICE.

RUDOLPH BACHMAN, OF LA PORTE, INDIANA, ASSIGNOR TO U. S. SLICING MACHINE COMPANY, OF LA PORTE, INDIANA, A CORPORATION OF INDIANA.

DRIVING MECHANISM FOR SLICING MACHINES.

Application filed April 14, 1923. Serial No. 632,046.

This invention relates to a power drive for slicing machines and has for its object the provision of means for driving the operating mechanism of the machine at different speeds for a given speed of the prime mover.

The invention is exemplified in the combination and arrangement of parts shown in the accompanying drawing and described in the following specification, and it is more particularly pointed out in the appended claims.

In the drawing—

Fig. 1 is a top plan view, with parts in section, illustrating one embodiment of the present invention as applied to a slicing machine;

Fig. 2 is a vertical section on line 2—2 of Fig. 1; and

Fig. 3 is a vertical section on line 3—3 of Fig. 1.

In my prior application, Serial No. 576,681, I have shown and claimed an improved apparatus for use in connection with a slicing machine similar to that of Patent No. 1,310,197, granted July 15, 1919. The present invention shows a further improvement of driving mechanism similar to that of my prior application.

The numeral 10 designates the frame of a slicing machine having a main drive shaft 11 and a motor 12. A pulley 13 is mounted on the motor shaft and connected by a belt 14 with a drive pulley 15 loosely mounted on a sleeve 16, the sleeve being journaled on a stud shaft 17 and connected by a gear 18 with the main shaft. A friction clutch 19 operated by a hand lever 20 serves to connect the pulley 15 with the sleeve 16 and drive the connected gearing. A belt tightener 21 operated by a spring 22 provides constant tension on the belt 14. The mechanism thus far described is similar to that set forth in my prior application named above.

In the present invention, as shown in Fig. 2, the pulley 13 is fixed to the motor shaft 23 and is provided with an extension 24 formed on the outer end of the pulley hub. The pulley 13 is provided with an expansion sleeve 25 which fits the face of the pulley 13 and is carried on a sleeve 26 slidably mounted on the extension 24. The extension 24 is provided with a key-way 27 in which pins 28 connected with the sleeve 26 are arranged to travel. A washer 29 retains the pins 28 in their key-way 27 and thus prevents removal of the sleeve 26 from its support 24.

The expansion sleeve 25 is provided with a crown or convex face 30 so that if the sleeve is moved inwardly, as viewed in Fig. 2, the inner edge will enter beneath the belt 14 and the belt will climb to the center of the convex surface 30 so that the driving face will have an increased diameter, thus increasing the speed of the driven part. The washer 29 and the pulley 13 are held in place on the shaft 23 by a screw 31 threaded in the end of the shaft 23. A pin 32 limits the inward movement of the pulley 13 and engages notches in the inner edge of the pulley hub to hold the pulley against rotation on the shaft 23.

The belt housing 33 is provided with an opening 34 through which the expansion pulley 25 is inserted and a flange member 35 is fastened to the housing 33 adjacent the opening 34 and in position to receive the sleeve 26. A grooved flange 36 is formed on the outer end of the sleeve 26 and a ring 37 is arranged adjacent the periphery of the flange 36. Shoes 38, Fig. 3, are disposed in the groove 39 in the flange 36 and are held in place by screws 40 arranged to travel in longitudinally extending grooves 41 in the flange 35. The screws are threaded in the ring 37 and are provided with extensions 42 which enter openings in the shoes 38 so that the shoes are carried with the screws 40 when they are moved longitudinally in their respective grooves. For moving the screws 40 a sleeve 43 is journaled on the outer face of the flange 35 and is provided with oppositely arranged helical slots 44 which engage the outer ends of the screws 40. The sleeve 43 is held in place by a ring or washer 45 secured to the flange 35 by screws 46. A handle 47 is attached to the sleeve 43 by means of which it is rotated about the flange 35 to cause the helical grooves 44 to impart longitudinal movement to the screws 40 and thus shift the expansion sleeve 25 into and out of operative relation with the belt 14.

I claim:—

1. Driving mechanism comprising a pulley having a belt arranged to travel thereon, an expansion sleeve surrounding said pulley and movable in the direction of the axis thereof into and out of position between the driving face of said pulley and said belt, said sleeve having a convex face and a beveled edge for entering beneath the edge of said belt, and a rotary cam co-axial with said pulley for moving said sleeve in the direction of the axis of said pulley.

2. Driving mechanism comprising a pulley having a belt arranged to travel thereon, means for taking up slack in said belt, an expansion member movable into position on the face of said pulley to increase the effective diameter thereof, a grooved flange connected with said expansion member, a traveler engaging said flange, and a rotary sleeve co-axial with said pulley having a cam groove therein for moving said traveler when said sleeve is rotated.

3. Driving mechanism for a slicing machine comprising a motor, a pulley operated by said motor, a belt arranged to travel on said pulley, means for taking up slack in said belt, clutch mechanism for connecting said belt to said slicing machine, means for varying the diameter of said driving pulley, and a rotary cam device coaxial with said pulley for actuating said means.

4. Driving mechanism for a slicing machine comprising a motor having a pulley connected therewith, a driven pulley, a belt connecting said pulleys, means for taking up slack in said belt, a cover for said pulleys and belt, means arranged within said cover for varying the effective diameter of one of said pulleys, and a cam device secured to the outer face of said cover for operating said means.

5. Power transmitting mechanism for driving a slicing machine comprising a motor mounted on said slicing machine, a friction clutch mounted on said slicing machine in spaced relation to said motor, a pulley driven by said motor, a second pulley connected with said friction clutch, a belt connecting said pulleys, means for taking up slack in said belt, a housing for said pulleys and belt, lever mechanism having a handle at one end of said housing for operating said friction clutch, means for varying the effective diameter of said motor pulley, and a cam device secured to said housing adjacent said clutch handle for operating said last-named means.

6. Power transmitting mechanism comprising a pulley having a belt arranged to travel thereon, an expansion sleeve movable in the direction of the axis of said pulley into and out of position to increase the effective diameter thereof, a housing for said pulley, a support having a cylindrical flange thereon provided with slots extending in the direction of the axis of said pulley, a grooved flange connected with said expansion sleeve, means for causing said expansion sleeve to rotate in unison with said pulley, travelers engaging said grooved flange and positioned in said longitudinally extending slots, and a rotary sleeve surrounding said flange and having cam grooves therein for engaging said travelers to shift said travelers and expansion sleeve in the direction of the axis of said pulley when said cam sleeve is rotated.

In testimony whereof I have signed my name to this specification on this 11th day of April, A. D. 1923.

RUDOLPH BACHMAN.